Dec. 23, 1969 W. A. BOOTHE 3,485,253

LIMIT OVERRIDE FLUIDIC CIRCUITS

Filed Dec. 30, 1966

Inventor:
Willis A. Boothe,
by Louis A. Moucha

United States Patent Office 3,485,253
Patented Dec. 23, 1969

3,485,253

LIMIT OVERRIDE FLUIDIC CIRCUITS

Willis A. Boothe, Scotia, N.Y., assignor to General Electric Company, a corporation of New York Filed Dec. 30, 1966, Ser. No. 606,397
Int. Cl. F15c 1/08; G06d 1/08; G06m 1/12
U.S. Cl. 137—81.5 10 Claims

ABSTRACT OF THE DISCLOSURE

A fluid amplifier circuit has at least three serially connected fluid amplifiers, the first and last being of the analog type, and the intermediate one(s) being of the digital type. The control fluid inlets and power fluid inlet of the last amplifier are respectively connected to both outputs of the first amplifier and one output of the digital amplifier to produce an analog type limit override signal at the outputs of the last amplifier only when a variable input signal to the first amplifier exceeds a predetermined maximum limit or is less than a minimum limit.

Figure 1:
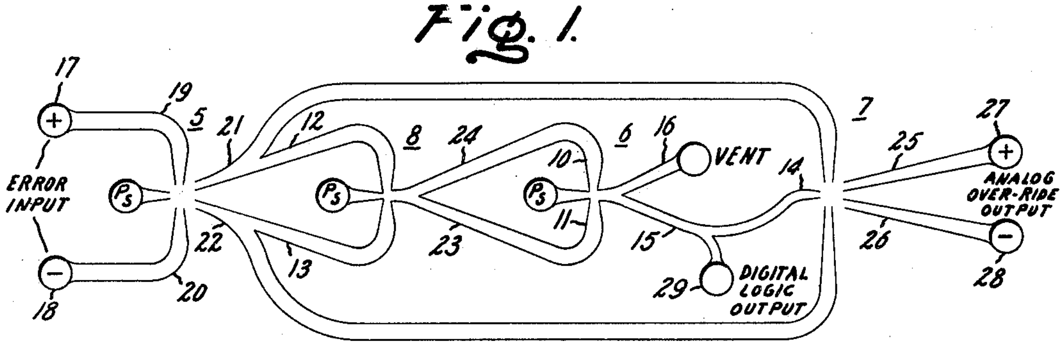

My invention relates to fluid amplifier circuits, and in particular, to fluidic circuits which provide the control system function of limit override.

Fluidic circuits employing the recently developed fluid control devices known as fluid amplifiers having no moving mechanical parts have many advantages over analogous electronic circuitry. In particular, the fluid amplifier is relatively simple in design, inexpensive in fabrication, capable of withstanding extreme environmental conditions such as shock, vibration, nuclear radiation and high temperature, and the no-moving parts feature permits substantially unlimited lifetime thereby achieving long periods of uninterrupted operation. These devices may be employed as analog and digital computing and control circuit elements, and also as power devices to operate valves and the like. The analog-type of fluid amplifier is commonly referred to as the momentum-exchange type wherein a fluid stream or jet to be controlled hereinafter described as the power fluid jet, is deflected by one or more control fluid jets directed laterally at the power jet from opposite sides thereof. The power jet is normally directed midway between two fluid receivers and is deflected relative to the receivers by an amount proportional to the net sideways momentum of the control jets. This device is therefore commonly described as a proportional or analog device. The digital-type fluid amplifier is commonly referred to as the boundary layer effect type wherein the power jet is deflected by the interaction of a control jet and the side walls of an interaction chamber shaped in such a way that the power jet attaches to one or the other of the two side walls of the interaction chamber, and the power jet is thereby directed to only one of the two fluid receivers at any instant of time. This device is therefore commonly described as a digital or switching device and may be monostable or bistable in operation as determined primarily by the length of the side walls of the interaction chamber. Fluidic circuitry employing one or more of the various type fluid amplifiers hereinabove described have recently been developed to perform many control system functions. One of the functions not yet provided is that of limit override whereby a signal is generated only when a particular system parameter exceeds a predetermined maximum limit or becomes less than a predetermined minimum limit thereof.

Therefore, one of the principal objects of my invention is to provide a fluidic circuit which provides the control system function of limit override.

Another object of my invention is to construct the circuit from analog and digital-type fluid amplifiers to thereby utilize both analog and digital logic fluid signals.

A further object of my invention is to provide a fluidic circuit which provides the function of maximum limit override.

A still further object of my invention is to provide a fluidic circuit which provides the function of minimum limit override.

Briefly summarized, my invention is a maximum limit override fluidic circuit and a minimum limit override fluidic circuit each comprising a first analog-type fluid amplifier for summing a variable pressurized fluid input signal representing the magnitude of a selected control system parameter and a constant pressurized fluid input signal representing a predetermined maximum or minimum limit of the parameter magnitude. A second digital-type fluid amplifier is in communication with the output of the first amplifier such that the fluid jet in the second amplifier is directed to a first output thereof when the parameter magnitude is less than the predetermined maximum or exceeds the predetermined minimum limit, and is directed to a second output thereof when the parameter magnitude exceeds the maximum or is less than the minimum limit. A third analog-type fluid amplifier is in communication with the first and second amplifiers, the power fluid inlet and control fluid inlets of the third amplifier being respectively connected to the second output of the second amplifier and both outputs of the first amplifier whereby a pressurized fluid limit override analog signal is provided at the outputs of the third amplifier only when the parameter magnitude exceeds the maximum limit or is less than the minimum limit.

Figure 2A:
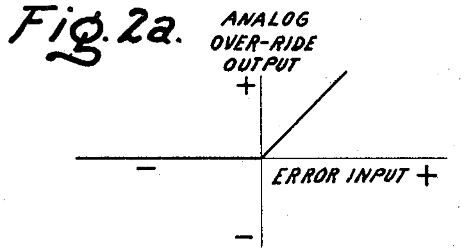
Figure 2B:
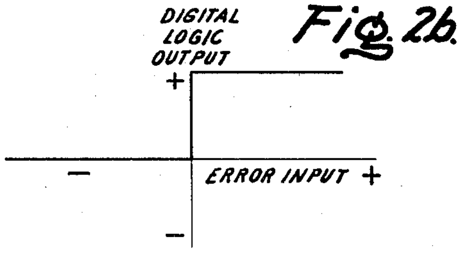
Figure 3:
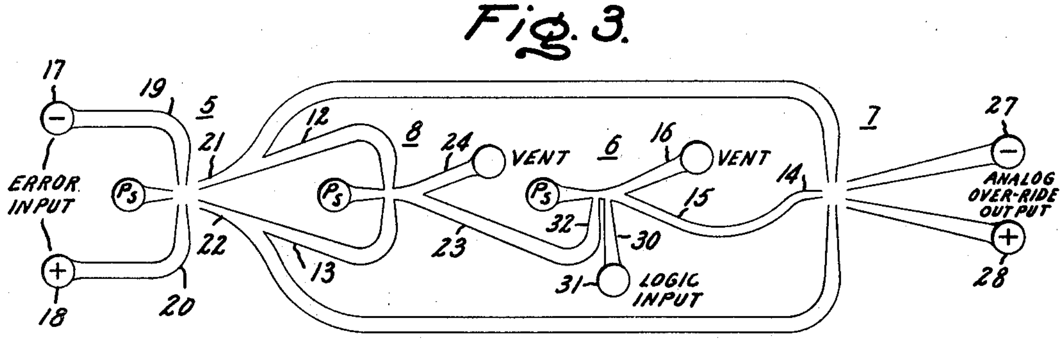
Figure 4:
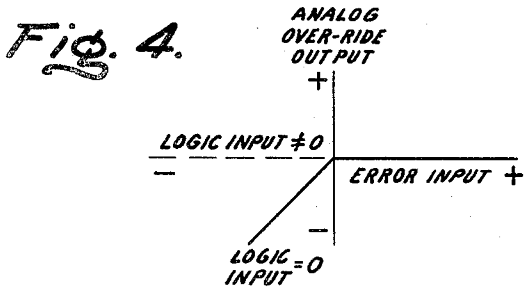

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

FIGURE 1 is a diagrammatic representation of a maximum limit override fluidic circuit constructed in accordance with my invention;

FIGURES 2*a* and 2*b* are graphical representations of the input-output characteristics of the FIGURE 1 circuit wherein FIGURE 2*a* indicates the analog output and FIGURE 2*b* the digital output;

FIGURE 3 is a diagrammatic representation of a minimum limit override fluidic circuit constructed in accordance with my invention; and FIGURE 4 is a graphical representation of the input-output characteristics of the circuit of FIGURE 3.

Referring now in particular to FIGURES 1 and 3, there are shown two fluidic circuits constructed in accordance with my invention each comprising at least three serially connected fluid amplifiers shown as a whole by numeral 5, 6 and 7. The first (input) amplifier 5 and last (output) amplifier 7 of the circuit are of the analog type whereas the intermediate connected amplifier 6 (and 8 if employed) are of the digital type and bistable in operation. Details of the structure and operation of the analog and digital type fluid amplifiers including the OR–NOR logic fluid amplifier 6 of FIGURE 3 are provided in applicant's U.S. Patent 3,232,533 and assigned to the same assignee as the present invention. It will suffice to describe the fluid amplifiers herein as being of the conventional type, each provided with two input control fluid passages (although the OR–NOR logic device in FIGURE 3 may have only one control input), one input power fluid passage and two output fluid receiving passages. The input control fluid and input power fluid passages, each include a fluid restrictor or nozzle at the terminal end for forming the respective control and power fluid jets, and will hereinafter be described as the control fluid inlets and power fluid inlets, respectively.

The control fluid inlets are disposed intermediate the power fluid inlet and the fluid receiving passages hereinafter described as the fluid receivers which are located downstream from the power fluid inlet. The serial connection of fluid amplifiers 5, 6 and 7 (and amplifier 8, if employed and connected between amplifiers 5 and 6 as illustrated) is accomplished in the following manner: the fluid receivers of the first amplifier stage 5 are in communication with or connected to the control fluid inlets of the stage 8. The two fluid receivers of the second stage are connected to the control fluid inlets of the third stage 6, in FIGURE 1, but only one such receiver is connected to one control fluid inlet in FIGURE 3. One receiver of the third stage 6 is connected to the power fluid inlet of the fourth stage 7 and the receivers of the fourth stage provide the (analog) output of my circuits. The receivers of the first stage 5 are also connected to the control fluid inlets of the fourth stage 7.

The fluidic circuits illustrated in FIGURES 1 and 3 are preferably formed as a unitary structure, but may, if desired, comprise separate fluid amplifier structures interconnected by suitable tubing. It should be understood that the second stage amplifier 8 may often be omitted if the characteristics of the other amplifiers are such that desired impedance matches are obtained. In the more general case wherein the digital amplifier 8 is omitted, the control fluid inlets 10 and 11 of digital amplifiers 6 are respectively placed in communication with receivers 12 and 13 of analog amplifier 5 (in FIGURE 1). The omission of amplifier 8 further necessitates a change (in FIGURES 1 and 3) in the interconnection of the power fluid inlet 14 of analog amplifier 7 from receiver 15 of amplifier 6 to receiver 16, and also in interchange of the vented output of amplifier 6 from receiver 16 to 15. In the case of my FIGURE 3 circuit, omission of amplifier 8 still further necessitates disposing the two control fluid inlets 30, 32 on the opposite side of the interaction chamber, connecting inlet 32 to receiver 21 of amplifier 5, and partial venting of receiver 22 through a suitable impedance.

Fluid amplifiers 5, 6 and 8 are each of the active type wherein the power fluid inlet is in communication with a source $P_s$ of constant pressurized fluid to thereby provide a continuous power jet in each of these amplifiers. Amplifier 7, however, is of the passive type wherein the power fluid inlet 14 thereof is not connected to any source of constant pressurized fluid but, instead, is in communication with receiver 15 of amplifier 6 in the case of a four amplifier circuit (and in communication with receiver 16 in the case of a three amplifier circuit). Thus, amplifier 7 generated a power fluid jet only when a pressurized fluid stream, the power jet in amplifier 6, is directed into receiver 15 of amplifier 6. At the other times when the jet is directed to vented receiver 16, amplifier 7 generates no power fluid jet.

The details and mode of operation of the maximum limit override circuit of FIGURE 1 will now be described. Two pressurized fluid signals are supplied to the input of my fluidic circuit at the terminals 17, 18 designated error input. The first input signal is a variable pressurized fluid signal which may represent the magnitude of a selected control system parameter which is being controlled in the particular control system. The parameter may be any variable capable of being detected or computed such as, for example, pressure, velocity, temperature. The variable input signal is of the analog type and may be single-ended and applied to (+) terminal 17, or of push-pull form applied to terminals 17, 18 with the sense that the pressure at (+) terminal 17 is greater than at (−) terminal 18 for the condition when the magnitude of the selected parameter exceeds the predetermined maximum limit, and vice versa. The second input signal is a constant pressurized fluid signal representing the predetermined maximum limit magnitude of the hereinabove selected control system parameter and is supplied to terminal 18. The difference in pressures between the variable and constant input signals is thus an ERROR INPUT supplied to terminals 17, 18 as illustrated. Fluidic summing resistors (not shown) may be employed at the input to terminals 17 and 18, if desired.

A specific example of my maximum limit override circuit for a jet engine control system will now be illustrated wherein the variable, analog input signal is proportional to compressor discharge pressure and the constant input signal is proportional to a predetermined maximum limiting value (limit) of the compressor discharge pressure at which the jet engine may be safely operated. The variable and constant input signals (i.e., the error signal) are supplied to the control fluid inlets 19 and 20 of the first analog fluid amplifier 5 which functions as a proportional summing amplifier. The two outputs of amplifier 5 (at the receivers 21 and 22 thereof) provide a differential pressure which is proportional to the amount by which the compressor discharge pressure is above or below the maximum limit value, and are equal when the variable input signal exactly equals the constant input signal. If the compressor discharge pressure is below the predetermined maximum limiting value, the pressurized output at receiver 21 is greater than the output at receiver 22 thereby causing digital amplifier 8, which has its control fluid inlets 12 and 13 connected to the outputs of amplifier 5, to direct the continuous power jet therein exclusively to receiver 23. The exclusive output at receiver 23 causes the second digital amplifier 6 to direct its continuous power jet exclusively to the vented receiver 16. Under this condition, no pressurized power fluid is supplied to the second analog amplifier 7 for generating a power jet wherein with the result that there is no output at the receivers 25 and 26 thereof. The receivers 25 and 26 are connected to output terminals 27 and 28, respectively, of the maximum limit override circuit. Thus, when the variable input to this circuit is below the predetermined maximum limit value, the circuit has no output at the analog override output terminals 27, 28, or at a digital logic output terminal 29 in communication with receiver 15 of digital amplifier 6. The mode of operation of my maximum limit override circuit for the condition wherein the compressor discharge pressure is less than the predetermined maximum limit is indicated at the left portion of the input-output characteristics in FIGURES 2*a* and 2*b* wherein minus (−) ERROR INPUT signifies that the variable input is less than the maximum limiting value (i.e., a negative polarity error) resulting in no override output. The abscissa and ordinate of the graphs of FIGURES 2*a*, 2*b* and 3 are in units of fluid pressure.

In the event that the predetermined maximum limit of compressor discharge pressure is exceeded, the sense of the error input signal is such that the pressure in control fluid inlet 19 is greater than in inlet 20, resulting in a greater (pressure) output in receiver 22 than in receiver 21. The differential pressure between the outputs at receivers 22 and 21 is proportional to the amount by which the predetermined maximum limit is exceeded. The greater pressurized signal at receiver 22 causes digital amplifier 8 to switch its output from receiver 23 to receiver 24, which in turn causes digital amplifier 6 to switch its output from vented receiver 16 to nonvented receiver 15. The exclusive output at receiver 15 produces an output at the digital output logic terminal 29 indicating that the predetermined maximum limit has been exceeded. The output at receiver 15 also supplies the pressurized power to analog amplifier 7 to thereby generate a power fluid jet therein. Since the control fluid inlets of amplifier 7 are in communication with the receivers of amplifier 5, the receivers 25 and 26 of analog amplifier 7 provide an amplified output of amplifier 5. Thus, during the condition wherein the compressor discharge pressure exceeds the predetermined limiting value, a differential pressure override limit signal of analog form is provided at receivers 25, 26 and output terminals 27, 28, the greater pressure being at (+) terminal 27, and the magnitude of the differential pressure being proportional to the amount by which the limit is exceeded. The mode of operation of my maximum limit override circuit for the condition wherein the compressor discharge pressure exceeds the predetermined limit is indicated at the right portion of the graphs in FIGURES 2*a* and 2*b* wherein positive (+) ERROR INPUT signifies that the variable input exceeds the limiting value (i.e., a positive polarity error) resulting in an override output. Terminals 27, 28 may be connected to a circuit controlling fuel flow to the combustor of the jet engine, the override signal being a command to reduce fuel flow.

It should be obvious that a mere change in connection of power fluid inlet 14 to the receiver 16 converts the FIGURE 1 embodiment to a minimum limit override circuit.

A minimum limit override fluidic circuit as illustrated in FIGURE 3 will now be described. The FIGURE 3 circuit is similar to the maximum limit override circuit of FIGURE 1 with the exception that only one control fluid inlet 32 of the second digital amplifier 6 is in communication with an output 23 of digital amplifier 8. Amplifier 6 is of the OR-NOR logic type wherein a second control fluid inlet 30 thereof is connected to a logic input terminal 31 in communication with a source of digital logic input signals. A digital logic output terminal may also be connected to receiver 15 of OR-NOR amplifier 6, if desired, as in the case of the FIGURE 1 embodiment.

The operation of my minimum limit override fluidic circuit will now be described with reference to the particular application as a compressor discharge pressure limit override circuit in a jet engine system. This application is utilized to provide an override signal commanding a greater fuel flow to the combustor when the compressor discharge pressure becomes less than a predetermined minimum limit. As in the case of the FIGURE 1 embodiment, variable and constant pressurized fluid input signals are supplied to ERROR INPUT terminals 17 and 18. The variable pressurized input signal is again proportional to the magnitude of the compressor discharge pressure, and may be single-ended and applied to terminal 18, or push-pull with the sense that the pressure at (+) terminal 18 is greater than at (−) terminal 17 for the condition when the magnitude of the compressor discharge pressure exceeds the predetermined minimum limit, and vice versa. The constant pressurized fluid input signal represents a predetermined minimum limit of the compressor discharge pressure and is supplied to terminal 17. The first amplifier stage 5 is a proportional summing amplifier as in the case of the FIGURE 1 embodiment and produces a differential output pressure at receivers 21 and 22 which is proportional to the amount by which the compressor discharge pressure is above or below the minimum limit value. If the compressor discharge pressure is exactly at the minimum limit, the two outputs of amplifier 5 are equal. If the compressor discharge pressure exceeds the minimum limit, the output at receiver 21 is at a greater pressure than the output at receiver 22 thereby causing the continuous power jet in digital amplifier 8 to be directed exclusively to receiver 23. As in the case of the FIGURE 1 embodiment, digital amplifier 8 may be omitted by the appropriate change in connections hereinabove described if the impedance characteristics of the various amplifiers may be matched without the use of such amplifier. The second digital amplifier 6 is an OR–NOR logic device which switches the power jet therein to the vented output 16 if any of the two indicated control fluid inlets 30, 32 are supplied with a pressurized fluid signal. Thus, if the compressor discharge pressure exceeds the minimum limit, the continuous power fluid jet in amplifier 6 is directed exclusively to vented output 16 resulting in no supply of power fluid to power fluid inlet 14 of the second analog amplifier 7. Under this condition, no output can be provided at the analog override output terminals 27, 28 of my minimum limit override circuit. The mode of operation of my minimum limit override circuit for the condition wherein the compressor discharge pressure exceeds the predetermined minimum limit is indicated at the right portion of the input-output characteristic in FIGURE 4 wherein (+) ERROR INPUT signifies that the variable input exceeds the minimum limiting value resulting in no override output.

In the event that the compressor discharge pressure decreases below the minimum limit, the sense of the error input signal is such that the pressure in control fluid inlet 19 is greater than in inlet 20, resulting in a greater pressure output in receiver 22 than in receiver 21. Again, the differential pressure between the outputs at receivers 22 and 21 is proportional to the amount by which the compressor discharge pressure is below the minimum limit. The greater pressurized output at receiver 22 causes digital amplifier 8 to switch its continuous power jet to the vented output at receiver 24. In this latter case, no control fluid flow is supplied to digital amplifier 6 from receiver 23, and if no signals are supplied to the LOGIC INPUT terminal 31, the output of OR–NOR amplifier 6 is directed exclusively to receiver 15 and thence to the power fluid inlet 14 of analog amplifier 7. Under this condition, wherein the compressor discharge pressure is less than the predetermined minimum limit thereof, the proportional output of analog amplifier 5 is amplified by analog amplifier 7 to provide the analog override output terminals 27 and 28 with an override limit signal proportional to the amount by which the compressor discharge pressure is less than the minimum limit, the greater pressure being at (−) terminal 27.

The supply of a logic input signal to LOGIC INPUT terminal 31 causes the output of OR–NOR amplifier 6 to be directed exclusively to vented output 16. This logic input signal thus can prevent the generation of an analog override output signal at output terminals 27, 28 even if the variable input signal (compressor discharge pressure) is less than the predetermined minimum limit signal. This feature is obtained from the operating characteristics of the OR–NOR logic device 6 wherein the presence of signals at either or both of the control fluid inlets thereof cause the device to switch its power jet to the vented output 16. Thus, the application of a signal to LOGIC INPUT terminal 31 has the effect of providing an override of any override signal which would otherwise be generated at output terminals 27, 28. An example of a signal which may be supplied to the logic input terminal 31 is a digital signal obtained when the jet engine temperature exceeds a predetermined maximum value. Under such condition, the temperature control will require a decreased fuel flow as opposed to an increased fuel flow required when the compressor discharge pressure decreases below a minimum limit. The temperature control is, in effect, a priority input which permits the temperature error to take precedence over the minimum compressor discharge pressure override since it is preferable to suffer a flameout rather than to severely overtemperature the turbine of the jet engine.

The mode of operation of my minimum limit override circuit for the condition wherein the compressor discharge pressure is less than the predetermined minimum limit is indicated at the left portion of the FIGURE 4 graph. It can be seen that under the condition wherein a signal is supplied to the logic input terminal 31 (logic input $\neq 0$) there is no output from the override circuit regardless of the state of the compressor discharge pressure (i.e., the error input).

It should be obvious that a mere change in connection of power fluid inlet 14 to the receiver 16 converts the FIGURE 3 embodiment to a maximum limit override circuit.

The outputs of the analog amplifier 7 of both the FIGURE 1 and 3 circuits are often connected to the inputs of a fluidic summing amplifier in the continuous error channel of a control system. The input to this latter summing amplifier is such that the effect of the output signal from my limit override circuit is much stronger than the signals from the continuous error portion of the control system.

Having described embodiments of my maximum limit override fluidic circuit and my minimum limit override fluidic circuit, it is believed obvious that modification and variation of my invention is possible in the light of the above teachings. The specific application of my fluidic circuits in a jet engine control system is for illustrative purposes only. Obviously, my circuits can be employed in any number of control systems wherein the magnitude of a selected control system parameter can be converted to a variable pressurized fluid signal. Thus, my basic circuit is comprised of a first analog type fluid amplifier, at least one digital type fluid amplifier and a second analog type fluid amplifier. The number of digital amplifiers connected between the two analog amplifiers may be increased to any number, as desired, with the realization that an odd number of serially connected digital amplifiers requires a change in the connection to the power fluid inlet of the second analog amplifier whereas an even number of digital amplifiers requires no change in connection from that illustrated in FIGURES 1 and 3. The number of analog amplifiers may also be increased at either or both of the input and output ends of the crcuits if a more highly amplified signal are desired. It may be desirable to add fluidic resistors in the fluid passages connecting receivers 21, 22 to the control fluid inlets of amplifier 7, and, or in the connection from such receivers to the control fluid inlets of amplifier 8 in order to obtain the proper loading of amplifier 5. Finally, other logic outputs may be provided, such as at receiver 16, or receivers 23, 24 for either override limit circuit, the sense of the logic at receivers 16 and 23 being opposite that at receivers 15 and 24.

What I claim as new and desire to secure by Letters Patent of the United States is:

1. A limit override fluidic circuit comprising
- an input stage first fluid amplifier of the analog type for summing a variable pressurized fluid input signal representing the magnitude of a selected control system parameter and a constant pressurized fluid input signal representing a predetermined maximum or minimum limit of the parameter magnitude,
- fluid amplifier means in communication with said first amplifier for directing a pressurized fluid jet in said means to a first output thereof when the parameter magnitude is less than the predetermined maximum or exceeds the predetermined minimum limit thereof, and for directing the jet to a second output thereof when the parameter magnitude exceeds the maximum or is less than the minimum limit, and
- an output stage second fluid amplifier of the analog type having inputs in communication with the outputs of said first amplifier and another input in communication with an output of said fluid amplifier means for providing a pressurized fluid limit override signal at the outputs of said output stage second amplifier only when the parameter magnitude exceeds the maximum limit or is less than the minimum limit, the limit override signal being of the analog type having a pressure magnitude proportional to the amount by which the maximum limit is exceeded, or is below the minimum limit.

2. The limit override fluidic circuit set forth in claim 1 wherein
- said means comprises a third fluid amplifier of the digital type.

3. The limit override fluidic circuit set forth in claim 2 wherein
- said third fluid amplifier is of the OR-NOR logic type.

4. The limit override fluidic circuit set forth in claim 1 wherein said means comprises
- a third fluid amplifier of the digital type having inputs in communication with the outputs of said first fluid amplifier for directing a pressurized fluid jet in said third amplifier to a first output thereof when the parameter magnitude is less than the predetermined maximum or exceeds the predetermined minimum limit thereof, and for directing the latter jet to a second output thereof when the parameter magnitude exceeds the maximum or is less than the minimum limit, and
- a fourth fluid amplifier of the digital type having inputs in communication with the outputs of said third fluid amplifier for directing a pressurized fluid jet in said fourth amplifier to a vented first output thereof when the parameter magnitude is less than the maximum or exceeds the minimum limit, and for directing the latter jet to a nonvented second output when the parameter magnitude exceeds the maximum or is less than the minimum limit, said nonvented second output in communication with an input of said second fluid amplifier.

5. The limit override fluidic circuit set forth in claim 4 wherein
- each of the four fluid amplifiers comprise
  - a power fluid inlet,
  - a pair of fluid receivers downstream from said power fluid inlet and comprising the respective outputs of the amplifier, and
  - a pair of control fluid inlets disposed intermediaate said power fluid inlet and said fluid receivers,
- the control fluid inlets of said first amplifier supplied with the variable and constant pressurized fluid input signals,
- the control fluid inlets of said second and third amplifiers in communication with the receivers of said first amplifier,
- the power fluid inlets of said first, third and fourth amplifiers in communication with a source of constant pressurized fluid, and
- the power fluid inlet of said second amplifier in communication with the nonvented second receiver of said fourth amplifier whereby said second amplifier provides the analog type limit override signal at the receivers thereof only when the fluid jet in said fourth amplifier is directed to the nonvented second receiver thereof.

6. The limit override fluidic circuit set forth in claim 5 wherein
- the control fluid inlets of said fourth amplifier are in communication with the receivers of said third amplifier, and
- the nonvented second receiver of said fourth amplifier including a second output providing a digital type limit override signal only when the fluid jet in said fourth amplifier is directed to the nonvented second receiver thereof.

7. The limit override fluidic circuit set forth in claim 5 wherein
- said fourth amplifier is of the OR–NOR logic type,
  - a first control fluid inlet thereof in communication with the first receiver of said third amplifier.

8. The limit override fluidic circuit set forth in claim 7 wherein
- said fourth amplifier including a second control fluid inlet in communication with a source of logic pressurized fluid input signals whereby the presence of the latter signal directs the jet in said fourth amplifier to the vented first output thereof to thereby prevent the generation of a limit override signal regardless of the magnitude of the system parameter.

9. A maximum limit override fluidic circuit comprising
- a first analog-type fluid amplifier, a second digital-type fluid amplifier, and
a third analog-type fluid amplifier,
each of said first, second and third amplifiers comprising
a power fluid inlet,
a pair of fluid receivers downstream from said power fluid inlet, and
a pair of opposed control fluid inlets disposed intermediate said power fluid inlet and said fluid receivers,
the control fluid inlets of said first amplifier in communication with a source of variable pressurized fluid input signals of the analog-type representing the magnitude of a selected control system parameter and a source of constant pressurized fluid input signal representing a predetermined maximum limit of the parameter magnitude,
the fluid receivers of said first amplifier in communication with the control fluid inlets of said second and third amplifiers,
the power fluid inlets of said first and second amplifiers in communication with a source of constant pressurized fluid for providing a constant pressurized fluid jet in each of said first and second amplifiers, and
a first receiver of said second amplifier being vented, a second nonvented receiver of said second amplifier in communication with the power fluid inlet of said third amplifier, the pressurized fluid jet in said second amplifier being directed to the second receiver thereof only when the parameter magnitude exceeds the predetermined maximum limit to thereby supply a pressurized fluid stream to said third amplifier which provides a pressurized fluid signal of the analog-type at the fluid receivers thereof, the latter signal representing a maximum limit override signal.

10. A minimum limit override fluidic circuit comprising
a first analog-type fluid amplifier,
a second digital-type fluid amplifier of the OR–NOR logic type, and
a third analog-type fluid amplifier,
each of said first, second and third amplifiers comprising
a power fluid inlet,
a pair of fluid receivers downstream from said power fluid inlet, and
a pair of control fluid inlets disposed intermediate said power fluid inlet and said fluid receivers, the pair of control fluid inlets of said first and third amplifiers disposed in opposed relationship, the control fluid inlets of said first amplifier in communication with a source of variable pressurized fluid input signals of the analog-type representing the magnitude of a selected control system parameter and a source of constant pressurized fluid input signal representing a predetermined minimum limit of the parameter magnitude,
the fluid receivers of said first amplifier in communication with the control fluid inlets of said third amplifier, one of the fluid receivers of said first amplifier in communication with one control fluid inlet of said second amplifier,
the power fluid inlets of said first and second amplifiers in communication with a source of constant pressurized fluid for providing a constant pressurized fluid jet in each of said first and second amplifiers, and
a first receiver of said second amplifier being vented, a second receiver of said second amplifier in communication with the power fluid inlet of said third amplifier, the pressurized fluid jet in said second amplifier being directed to the second receiver thereof only when the parameter magnitude is less than the predetermined minimum limit to thereby supply a pressurized fluid stream to said third amplifier which provides a pressurized fluid signal of the analog-type at the fluid receivers thereof, the latter signal representing a minimum limit override signal.

References Cited

UNITED STATES PATENTS

| | | | |
|---|---|---|---|
| 3,107,850 | 10/1963 | Warren et al. | 137—815 XR |
| 3,155,825 | 11/1964 | Boothe. | |
| 3,193,197 | 7/1965 | Bauer | 137—815 XR |
| 3,244,370 | 4/1966 | Colston | 137—815 XR |
| 3,305,170 | 2/1967 | Zilberfarb | 137—815 XR |
| 3,338,515 | 8/1967 | Dexter | 137—815 XR |
| 3,340,885 | 9/1967 | Bauer | 137—815 |
| 3,348,562 | 10/1967 | Ogren | 137—815 |
| 3,350,008 | 10/1967 | Avery | 235—201 |
| 3,380,655 | 4/1968 | Swartz | 137—815 XR |
| 3,405,726 | 10/1968 | Wood | 137—815 |
| 3,410,289 | 11/1968 | Dexter | 137—815 |

SAMUEL SCOTT, Primary Examiner

U.S. Cl. X.R.

235—201